Aug. 7, 1923.

E. I. BRADDOCK

GEAR CHAIN

Filed May 22, 1920

INVENTOR.
Edward I. Braddock
BY
Jas. H. Churchill
ATTORNEY.

Patented Aug. 7, 1923.

1,463,789

UNITED STATES PATENT OFFICE.

EDWARD I. BRADDOCK, OF WINCHESTER, MASSACHUSETTS.

GEAR CHAIN.

Application filed May 22, 1920. Serial No. 383,460.

*To all whom it may concern:*

Be it known that I, EDWARD I. BRADDOCK, a citizen of the United States, residing in Winchester, in the county of Middlesex and State of Massachusetts, have invented an Improvement in Gear Chains, of which the following description, in connection with the accompanying drawings, is a specification, like characters on the drawings representing like parts.

This invention relates to a gear chain and has for its object to provide a gear chain, which is capable of being used with the standard gears commonly found on the market, whereby the standard gears are enabled to be used in many places or on jobs where specially cut gears and chains are now required.

The invention further has for its object to provide a gear chain which is of increased strength and can be produced at a minimum expense.

In accordance with this invention the gear chain is composed of links provided with gear teeth and pivotally connected together, with the pivots for the links located in the pitch line of the teeth of said links, which pitch line corresponds with the pitch line of the teeth of the gear with which the gear teeth of the chain co-operates.

The toothed links of the said gear chain may be composed of a plurality of members or of a single member, as will be described.

These and other features of this invention will be pointed out in the claims at the end of this specification.

Figure 3:
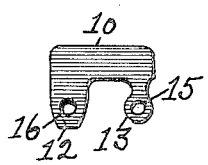

Fig. 3, a view of a single toothed link.

Figure 4:
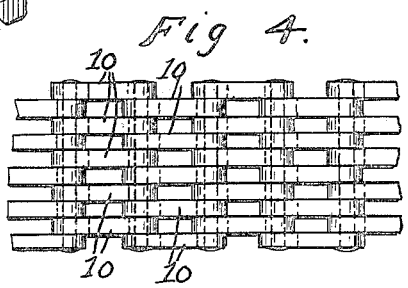

Fig. 4, a plan view of a portion of the gear chain.

Referring to Figs. 1 to 4, inclusive, $a$ represents a standard gear provided with teeth $b$ whose pitch line is represented by the circle $c$, and $d$ represents a gear chain embodying this invention and designed to be used with said gear.

The gear chain $d$ shown in Figs. 1 to 4 comprises links, each composed of a plurality of members 10, which are provided with teeth 12 and arms 13. The tooth 12 of each link member is provided with the same pitch as the pitch of the standard gear $a$ with which it is to be used and has connected with it by the pivot pin 14 the arm 13 of the next adjacent link of the chain. The arm 13 is not designed to engage the teeth $b$ of the gear $a$ and is provided with a circular opening 15, whose center is located in the pitch line of the tooth 12 of the links of the gear chain, and therefore in the pitch line of the gear $a$, as clearly represented in Figs. 1 and 2.

Figure 1:
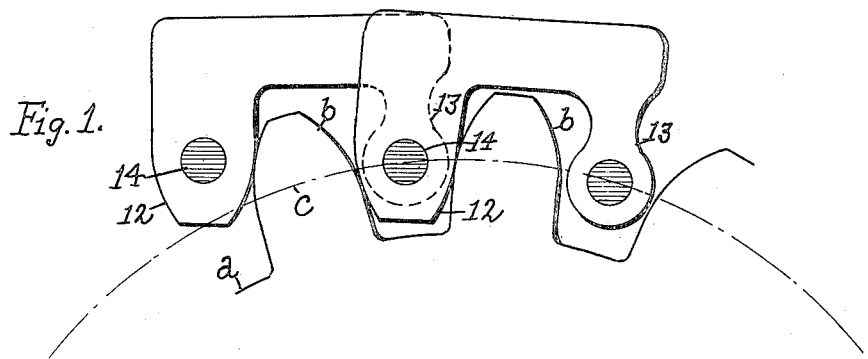
Fig. 1 represents two toothed links of a gear chain embodying this invention.
Figure 2:
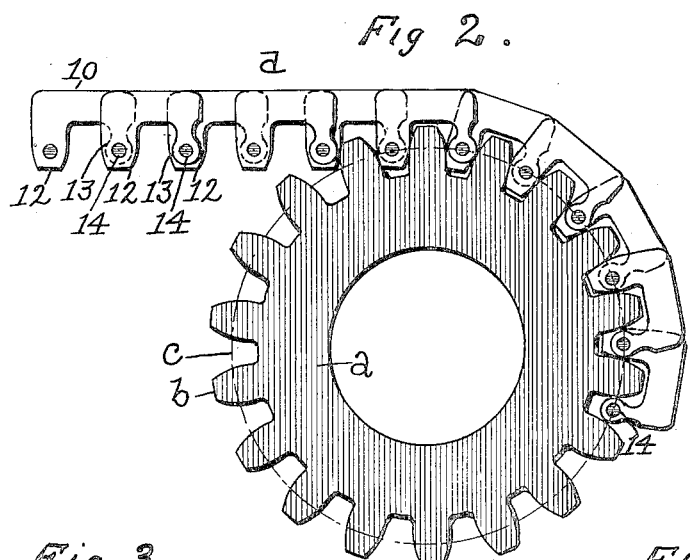
Fig. 2 represents a standard gear and a greater length of gear chain than that shown in Fig. 1.

The tooth 12 of one link member is pivoted to the arm 13 of an adjacent member by the pivot pin 14, which is passed through the opening 16 in the tooth and through the opening 15 in the arm 13, and in the construction shown in Figs. 1, 2 and 4, each link of the chain is composed of a plurality of members herein shown as five in number, whose teeth 12 are mounted on a common pivot pin upon which are also mounted the arms 13 of five preceding link members.

By reference to Fig. 2, it will be observed that the teeth of those link members in mesh with the teeth of the gear $a$ have their pivot pins in the pitch line of the gear which is represented by the circle $c$ which passes through the center of the pivot pins 14.

In the construction herein shown, it will be noticed that the pivot connecting the gear tooth of one member of the gear chain is in the pitch line of the teeth of said chain, and that this pitch line corresponds with the pitch line of the teeth of the gear with which it co-operates, and therefore a single gear chain may be used with gears of different sizes but having the same pitch of teeth.

It will be observed that each link of the gear chain is provided with a single gear tooth which engages the teeth of the gear and has a pivotal connection with the next adjacent link of the chain on the pitch line of the gear As a result, the gear chain herein described will co-operate and properly mesh with the common gear of standard pitch, thereby avoiding the necessity of cutting the gear to fit the chain, which is the practice now commonly employed when it is desired to use a gear chain with a gear.

Because the gear chain herein described does mesh properly with the standard gear, it enables the latter to be used in many places where now it requires specially cut gears and chains, and thereby enables certain jobs to be performed at a minimum cost.

By reference to the drawing, it will be seen that the gear teeth of the chain co-operate with the teeth of the gear in the same manner as the teeth of a co-operating gear, and therefore can be run in either direction.

Claims.

1. As an improved article of manufacture, a gear chain composed of links having gear teeth and arms smaller than said gear teeth, with the gear tooth of one link pivotally connected with the smaller arm of an adjacent link substantially on the pitch line of said gear tooth.

2. As an improved article of manufacture, a gear chain composed of links having gear teeth, each link having a single tooth and an arm smaller than said tooth which is pivotally connected with the smaller arm of an adjacent link substantially on the pitch link of said tooth.

In testimony whereof, I have signed my name to this specification.

EDWARD I. BRADDOCK.